Patented Aug. 12, 1930

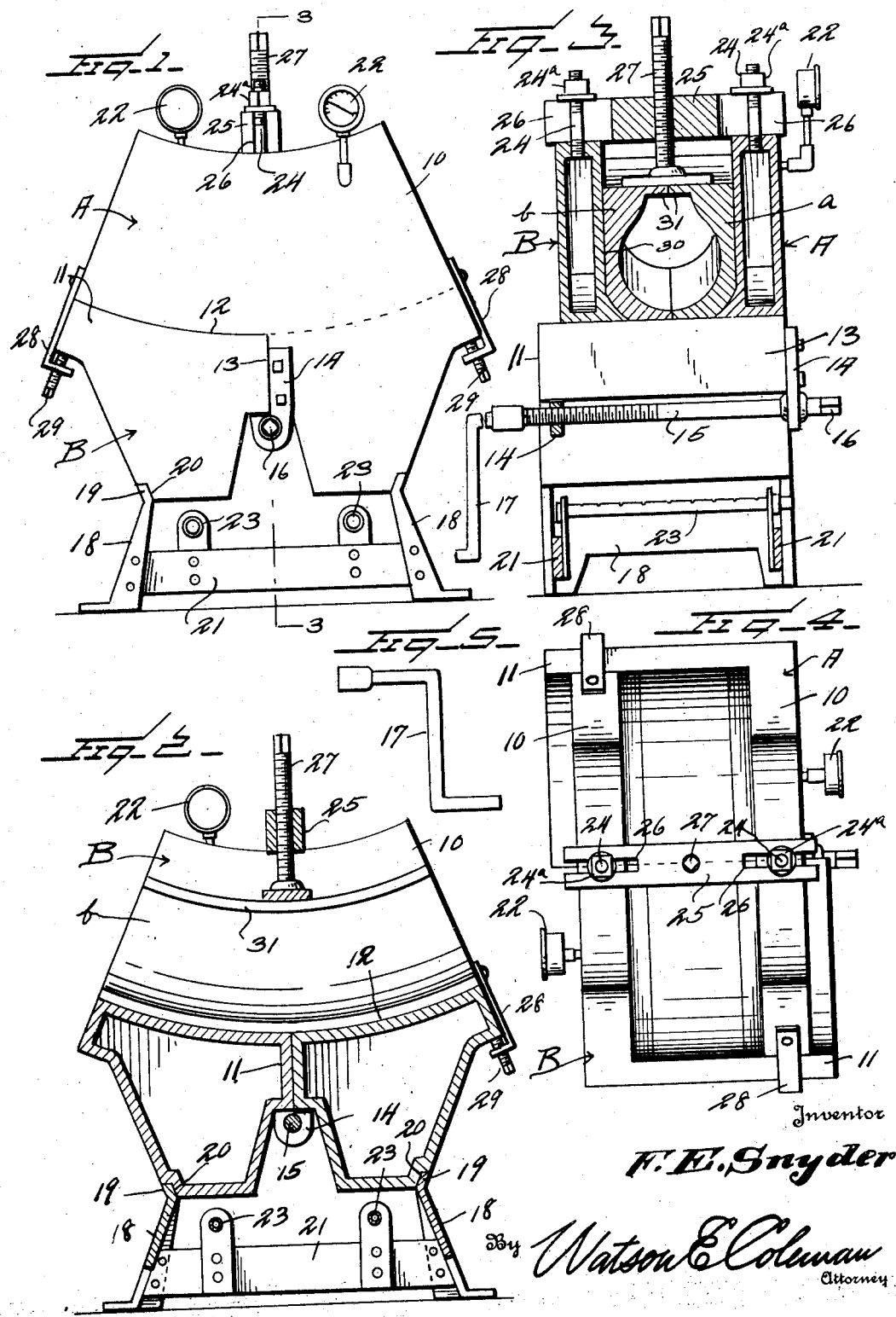

1,772,644

UNITED STATES PATENT OFFICE

FRANK E. SNYDER, OF SANTA ANA, CALIFORNIA

ADJUSTABLE TIRE-VULCANIZING MOLD

Application filed March 24, 1928. Serial No. 264,374.

This invention relates to vulcanizing or curing molds and particularly to a mold for vulcanizing and curing automobile tires or to be used in the repair of automobile tires. These molds are ordinarily made with two lateral walls and a transversely extending body, the walls and body being hollow so that they may be filled with steam, hot water or other heated fluid. The tire to be vulcanized is disposed between split shells, the shells and the tire are then disposed between the side walls of the mold, and pressure is applied to bring the shells and the walls of the tire in close contact with the walls of the mold to thus cause the heat to be transferred to the tire.

The general object of the present invention is to provide a mold which is laterally adjustable to different widths so that a single mold may be used for different widths of tires and in this connection to provide a tire shell which is formed of two lateral sections adapted to be disposed around the tire and then to be disposed between the mold walls, the formation of the lateral shells permitting the mold walls to be forced towards each other to thus hold the tire securely in position.

A further object is to provide means whereby the adjustment of the tire walls may be quickly secured whereby the tire walls may be held in their adjusted positions and to provide a clamp permitting the adjustment of these walls.

Further objects will appear in the course of the following description.

My invention is illustrated in the accompanying drawings, wherein:—

Figure 1 is a side elevation of a tire vulcanizing mold constructed in accordance with my invention;

Figure 2 is a longitudinal view thereof;

Figure 3 is a sectional view on the line 3—3 of Figure 1;

Figure 4 is a top plan view;

Figure 5 is an elevation of a crank.

Referring to these drawings, it will be seen that the mold is formed in two sections A and B. The section A consists of a side wall 10 and a laterally projecting portion 11. The inner face of this laterally projecting portion 11 is circular as at 12 to fit the circumference of the tire.

The section B is a duplicate of the section A and is provided with the side wall 10 and the laterally projecting portion 11, these two sections being complementary to each other, the confronting edges of the bottom section having meeting faces 13. These side walls 10 and the corresponding laterally projecting portion 11 are hollow so that hot water, steam or other heating material may fill or circulate within these spaces. It will be understood that each side wall 10 is curved to fit the face 12 of the opposed section.

For the purpose of adjusting the section laterally with relation to each other and to thus increase or decrease the distance between the side walls 10, I provide the hangers 14 which are mounted upon the sections A and B adjacent the confronting edge faces 13 and mounted in this hanger is a transversely extending screw 15 having rotative bearing in one hanger without longitudinal movement and having screw-threaded engagement with the other hanger 14. Thus it will be obvious that as the screw is rotated in one direction, the two sections A and B will be forced toward each other and when the screw is rotated in the other direction, the two sections will be forced away from each other. Preferably this screw shaft 15 will be formed at its ends with many sided portions 16 whereby a crank 17 may be applied to the shaft to rotate it from either side. The two sections are supported upon a base 18, this base having transversely extending portions 19 which fit in grooves 20 formed in the lower corners of the mold, the base being of sufficient size to permit of the adjustment of the mold section. The base may be of any suitable construction but it is preferably of metal held together by the braces 21.

A steam coil may be provided below the mold, said coil being connected to the mold. Pressure and temperature indicators 22 may be connected to the mold in any suitable manner. Burners 23 may be provided below the sections for heating the same. It will be understood however, that I do not wish to be limited to the particular heating means shown as other means might be provided.

For the purpose of clamping the tire and the two opposed shells enclosing the tire into the space between the sections A and B and against the faces 12 of the two sections I provide the walls 10 with the upwardly projecting screws 24 and provide a brace 25 having slots 26 at its ends to receive said screws. Extending downward through this space is a crank shaft 27 preferably formed at its upper end to receive a crank and screw-threaded at its lower end to receive a presser foot or plunger to engage the tire in the usual and well-known manner. By slotting the extremities of this brace 25 the brace will permit the inward and outward movement of the two sections.

In order to hold the two sections of the mold in locked position, lugs 28 are provided attached to the side walls and bent over to extend beneath the floor or bottom of the other section as shown in Figure 1. These lugs are provided with set screws 29. In order to clamp the two sections in a locked position it is only necessary to turn the set screws inward after the mold has been adjusted. This holds the two sections in adjusted position and prevents any possible expansion of the two sections. The brace 25 also acts as means for holding the two side walls or two sections of the mold in adjusted position by the use of nuts 24ª on the screws 24 which may be turned down so as to engage this cross bar 25.

The shell which is used with this mold is of the split type, that is the shell is formed of two sections (see Fig. 3), designated a and b respectively. Both of these sections are alike. Each section has its side face flat as at 30 the inside face of each section, however, being formed to conform to the contour of the tire. The two sections of the shell are disposed with their upper and lower flanges at confronting each other. The tire is placed between the two sections, the tire disposed within the mold, the mold tightened up so that the side walls of the mold come in close contact with the flat face 30 of the two sections and the bottom of the mold comes in close contact with the outer flanges of the sections. The shell goes around the tire to hold it in position and it is an important factor in the success of the machine. Of course, it will be understood that the sizes of the shells may be varied and that each machine will have an assortment of shells. The molds are, of course, to be made in different sizes and the radius of the mold bottom will vary with the size. The mold opens and closes in the same manner as a vise and may be set at any point within its limits. This mold will handle any size of tire from the smallest to the largest within its range. It is particularly adapted for making a section repair. This apparatus will accommodate any size tire and the properly heated form may be pressed close against the tire.

While I have illustrated a construction which I have found to be particularly advantageous, I do not wish to be limited to the exact construction.

It is to be understood that the screw 27 may extend down into the tire or merely to the shell, as illustrated. This depends upon the method of exerting pressure on the side of the rim. If the shells are used, the screw extends down to the shells. If, on the other hand, a sand bag is used for the inside pressure instead of the usual air or steam bag, which must be used when the shell is used, the screw will go into the tire and rest on the sand bag. This sand bag or the air or steam bags are necessary to hold the tire in shape during the process of curing the section.

One of the primary purposes of the mold which I have devised is not only to make it adjustable but it is to so construct it as to provide a correct heat to the parts of the tire being repaired, and one of the ways is to eliminate the shells as much as possible. They must be used, however, where it is desired to cure an injury to the side wall or the bead of the tire. The use of the shell accomplishes this function without leaving any marks upon the tire such as would be left by the ordinary bead iron commonly used. Other shells known to me do not cover all of the tire, as in the present case, and part of the curing is done with the aid of bead irons which tend to leave marks on the tire that are undesirable. The shell which I have illustrated is a combination shell and bead iron. I do not wish to be limited to the exact adjusting screw which is illustrated, as this might be formed with two reverse threads instead of merely with a thread at one end. Obviously, one construction is the equivalent of the other.

Many minor changes may be made in the details of construction and arrangement of parts without departing from the spirit of the invention as defined in the appended claims.

I claim:—

1. A vulcanizing mold formed in two sections, each section having a side wall and a bottom wall, concavely curved upon its inside face, the side wall of each section extending beyond the bottom wall and bearing against the inner face of the bottom wall of the other section, the bottom walls thus projecting in opposite directions and means whereby the two sections may be shifted toward or from each other.

2. A vulcanizing mold formed in two sections, each section having a side wall and a bottom wall, concavely curved upon its inside face, the side wall of each section extending beyond the bottom wall and bearing against the inner face of the bottom wall of the other section, the bottom walls thus projecting in opposite directions and means whereby the two sections may be shifted toward or from each other, said means including a screw having rotative engagement with one of said sections and screw-threaded engagement with the other section.

3. A vulcanizing mold for tires formed in two sections, each section having a side wall and a bottom wall, the side wall of each section projecting beyond the bottom wall of the said section whereby the bottom wall of one section may overlap and extend beneath a portion of the side wall of the other section, said side walls and bottom walls being hollow, means for adjusting the two sections to carry their side walls toward or from each other and hold them in this adjusted position, and means for heating fluid within the hollow sections.

4. A vulcanizing mold for tires formed in two sections, each section having a side wall and bottom wall, the side wall of each section projecting beyond the bottom wall of the said section whereby the bottom wall of one section may overlap and extend beneath a portion of the side wall of the other section, said side walls and bottom walls being hollow, means for adjusting the two sections to carry their side walls toward or from each other and hold them in this adjusted position, a brace engaging across the tops of the side walls, said brace having a solid middle portion and longitudinally slotted end portions, screws extending up through the side walls and through said slots, clamping nuts on the screws, and a clamping screw extending downward through the middle of the brace.

5. A vulcanizing mold comprising two sections, each having a side wall and a bottom, the side wall of each section having a length twice as long as that of the bottom wall of the corresponding section whereby the bottom wall of one section may overlap and extend beneath a portion of the side wall of the other section, the sections being slidable upon each other to thereby adjust the side walls toward or from each other, means for holding the sections in adjusted position, a tire shell formed of two longitudinally split sections having their outer faces formed to fit against the side walls of the mold and their inner faces to conform to the shape of the tire, and means carried by the mold for exerting pressure upon the tire shell in a direction parallel to the side walls.

In testimony whereof I hereunto affix my signature.

FRANK E. SNYDER.